(12) United States Patent
Cudak et al.

(10) Patent No.: US 12,411,715 B2
(45) Date of Patent: Sep. 9, 2025

(54) EFFICIENCY-ADJUSTED HARDWARE RESOURCE CAPACITY TO SUPPORT A WORKLOAD PLACEMENT DECISION

(71) Applicant: Lenovo Global Technology (United States) Inc., Morrisville, NC (US)

(72) Inventors: Gary D Cudak, Raleigh, NC (US); Ajay Dholakia, Cary, NC (US); Srihari V Angaluri, Raleigh, NC (US); Paul T. Artman, Cary, NC (US)

( * ) Notice: Subject to any disclaimer, the term of this patent is extended or adjusted under 35 U.S.C. 154(b) by 654 days.

(21) Appl. No.: 17/697,051

(22) Filed: Mar. 17, 2022

(65) Prior Publication Data

US 2023/0297431 A1  Sep. 21, 2023

(51) Int. Cl.
*G06F 9/50* (2006.01)
*G06F 9/48* (2006.01)

(52) U.S. Cl.
CPC .............. *G06F 9/5044* (2013.01); *G06F 9/48* (2013.01); *G06F 9/4806* (2013.01); *G06F 9/4843* (2013.01); *G06F 9/485* (2013.01); *G06F 9/4856* (2013.01); *G06F 9/4881* (2013.01); *G06F 9/4893* (2013.01); *G06F 9/50* (2013.01); *G06F 9/5005* (2013.01); *G06F 9/5083* (2013.01); *G06F 9/5088* (2013.01)

(58) Field of Classification Search
CPC ........ G06F 9/48; G06F 9/4806; G06F 9/4843; G06F 9/485; G06F 9/4856; G06F 9/4881; G06F 9/4893; G06F 9/50; G06F 9/5005; G06F 9/5044; G06F 9/5083; G06F 9/5088; G06F 9/5094
See application file for complete search history.

(56) References Cited

U.S. PATENT DOCUMENTS

| | | | |
|---|---|---|---|
| 2011/0213508 A1* | 9/2011 | Mandagere | G06F 9/5088 700/291 |
| 2016/0187395 A1* | 6/2016 | Bodas | G06Q 10/06 702/60 |
| 2017/0255239 A1* | 9/2017 | Matteson | G06F 1/3209 |
| 2017/0286178 A1* | 10/2017 | Chougule | G06F 9/505 |
| 2019/0163540 A1* | 5/2019 | Lee | G06F 9/5077 |
| 2019/0235922 A1* | 8/2019 | Iovanna | G06F 9/5088 |
| 2021/0004245 A1* | 1/2021 | Kamath | G06F 9/5077 |
| 2021/0064433 A1* | 3/2021 | Nakfour | G06F 9/5027 |
| 2021/0119891 A1* | 4/2021 | Mundt | H04L 43/065 |

* cited by examiner

*Primary Examiner* — Charles M Swift
(74) *Attorney, Agent, or Firm* — Jeffrey L. Streets (57) ABSTRACT

A method includes identifying hardware resource requirements of a candidate workload instance, wherein the hardware resource requirements of the workload instance include a required capacity for each of a plurality of hardware resource types. The method further includes identifying, for each of the plurality of hardware resource types required by the candidate workload instance, a capacity of a hardware resource of the hardware resource type that is currently available on a server without causing a power efficiency of the hardware resource to decline below a setpoint power efficiency; and determining, for each of the plurality of hardware resource types required by the candidate workload instance, whether the identified capacity of the hardware resource on the server is greater than or equal to the required capacity for the hardware resource type. The determination may support a decision to place the workload instance on the server or another server.

19 Claims, 5 Drawing Sheets

EFFICIENCY-ADJUSTED HARDWARE RESOURCE CAPACITY TO SUPPORT A WORKLOAD PLACEMENT DECISION

BACKGROUND

The present disclosure relates to methods of determining and reporting available capacity of hardware resources on a server to support a workload placement decision.

BACKGROUND OF THE RELATED ART

Large computing systems in data centers have a very high demand for electrical power and cooling capacity. The cost of electrical power and cooling are two of the most significant factors in the total cost of operating a datacenter. However, the cluster management servers, operating systems and hypervisors in the datacenter may attempt to save power by consolidating workload onto a small number of servers and then shutting down other servers that are not currently needed. Another known strategy for power saving or management is to enforce a power cap or limit on one or more of the servers such that the system is simply not allowed to exceed a desired power budget. However, there continues to be a need for additional ways to use power more efficiently in a datacenter or other large computer system.

BRIEF SUMMARY

Some embodiments provide a method including identifying hardware resource requirements of a candidate workload instance, wherein the hardware resource requirements of the candidate workload instance include a required capacity for each of a plurality of hardware resource types. The method further includes identifying, for each of the plurality of hardware resource types required by the candidate workload instance, a capacity of a hardware resource of the hardware resource type that is currently available on a server without causing a power efficiency of the hardware resource to decline below a setpoint level of power efficiency; and determining, for each of the plurality of hardware resource types required by the candidate) workload instance, whether the identified capacity of the hardware resource on the server is greater than or equal to the required capacity for the hardware resource type.

Some embodiments provide a computer program product comprising a non-volatile computer readable medium and non-transitory program instructions embodied therein, the program instructions being configured to be executable by a processor to cause the processor to perform various operations. The operations include identifying hardware resource requirements of a candidate workload instance, wherein the hardware resource requirements of the candidate workload instance include a required capacity for each of a plurality of hardware resource types. The operation further include identifying, for each of the plurality of hardware resource types required by the candidate workload instance, a capacity of a hardware resource of the hardware resource type that is currently available on a server without causing a power efficiency of the hardware resource to decline below a setpoint level of power efficiency; and determining, for each of the plurality of hardware resource types required by the candidate workload instance, whether the identified capacity of the hardware resource on the server is greater than or equal to the required capacity for the hardware resource type.

DETAILED DESCRIPTION

Some embodiments provide a method including identifying hardware resource requirements of a candidate workload instance, wherein the hardware resource requirements of the candidate workload instance include a required capacity for each of a plurality of hardware resource types. The method further includes identifying, for each of the plurality of hardware resource types required by the candidate workload instance, a capacity of a hardware resource of the hardware resource type that is currently available on a server without causing a power efficiency of the hardware resource to decline below a setpoint level of power efficiency; and determining, for each of the plurality of hardware resource types required by the candidate workload instance, whether the identified capacity of the hardware resource on the server is greater than or equal to the required capacity for the hardware resource type.

A "workload instance" is a specific and distinctly identifiable process that may be executed by a computer. The workload instance may be a process executing the program instructions of a computer program. In one example, two separate computer programs may be executed such that the processes of executing these two computer programs are separate workload instances. Furthermore, any particular computer program may be executed multiple times (perhaps for different clients, using different data, or at different times), such that each execution of the process is a separate workload instance. A workload instance may also be referred to as a job, a set of tasks, or a unit of execution. A candidate workload instance may be received from a client device.

In some embodiments, a workload instance may have identified hardware resource requirements, such as types of hardware resources that are required to perform the workload instance and an amount or capacity of performance required of each hardware type to perform the workload instance. The identified hardware resource requirements of any particular workload instance may be directly identified by the workload instance, such as with metadata accompanying the workload instance. Alternatively, the identified hardware resource requirements of any particular workload instance may be inferred by associating some aspect of the workload instance with a historical record of hardware resource usage (requirements) of one or more other workload instances that had the same or similar aspect. For example, a particular workload instance may be associated with hardware requirements including an amount of processor usage, memory usage, input/output usage, and GPU usage. Therefore, the workload instance should be assigned to a server with a sufficient amount of available processor, memory, I/O and GPU capacity to perform the candidate workload instance without any of these components' utilization getting so high that the power efficiency would drop significantly. In one non-limiting example, the identified hardware resource requirements of a workload instance may quantify a required performance capacity of a processor in units of "millions of instructions", a percentage of processor utilization, or an amount of power consumption or load. In another non-limiting example, the identified hardware resource requirements of a workload instance may quantify a required performance capacity of random-access memory in units of megabytes.

In some embodiments, the method may further include assigning the candidate workload instance to be performed by the server in response to determining, for each of the plurality of hardware resource types required by the candidate workload instance, that the identified capacity of the hardware resource on the server is greater than or equal to the required capacity for the hardware resource type. In a server cluster, a host may be responsible for making a workload placement decision using information or indications received from the baseboard management controller. For example, the host may be a device or process selected from an operating system, a hypervisor, or a central management entity. In one option, the candidate workload instance may be a new workload instance, wherein assigning the candidate workload instance to be performed by the server includes provisioning the candidate workload instance to the server. In another option, the candidate workload instance may be an active workload instance on another server, wherein assigning the candidate workload instance to be performed by the server includes migrating the candidate workload instance to the server.

In some embodiments, the identified capacity of the hardware resource of the hardware resource type that is currently available on the server and can be used without causing the hardware resource to operate at less than a setpoint level of power efficiency may be less than a total capacity of the hardware resource. For example, the baseboard management controller may adjust or mis-represent the amount of hardware resources that are actually available within their total capacity in favor of one or more hardware resources, or hardware resource groupings, that have capacity to perform a workload instance with at least the setpoint power efficiency. The extent to which the baseboard management controller adjusts or misrepresents the available hardware resources may be established in administrator settings, which may be referred to as a power efficiency rule. The power efficiency rule is preferably established by an administrator (administrative personnel) and communicated to the baseboard management controller of each server such that the same power efficiency rule is implemented in each of the plurality of servers, but this is not required. However, the administrator may also make dynamic changes to the power efficient rule(s) to achieve the objective of placing workload instances on the servers with the most power-efficient available resource capacity and/or the objective of supporting all workload instances that need to be timely performed on the server. For example, a gradual relaxing of power efficiency rules for some or all of the servers will assure that workload instances continue to be performed on the server with the most power efficient available resource capacity as the amount of power efficient available resource capacity is gradually expanded. Optionally, the host device may include settings that allow an administrator to select to enable/disable the use of a power efficiency rule and/or to allow the administrator to select an active power efficiency rule to activate from among multiple power efficiency rules, such that the host device may then instruct the baseboard management controllers of each server to implement the selected power efficiency rule.

In some embodiments, the baseboard management controller may determine the efficiency-adjusted available resource capacity according to a power efficiency rule. The power efficiency rule may indicate that no power efficiency reduction is allowed, no more than a predetermined power efficiency reduction is allowed, or a minimum power efficiency must be maintained. Therefore, the baseboard management controller may determine an amount of the total available (un-utilized) resource capacity of the server that can be used to perform an additional workload instance without violating the power efficiency rule. It should be appreciated that the amount of efficiency-adjusted available resource capacity will be directly affected by the power efficiency rule. Specifically, a first power efficiency rule that disallows any power efficiency reduction will cause the baseboard management controller to report a first set of efficiency-adjusted available resource capacity, and a second power efficiency rule that allows up to a two-percent (2%) power efficiency reduction will cause the baseboard management controller to report a second set of efficiency-adjusted available resource capacity that is greater than the first set of efficiency-adjusted available resource capacities.

In some embodiments, the setpoint level of power efficiency, for each of the hardware resource types, is equal to a current level of power efficiency for hardware resources of the hardware resource type on the server. With the setpoint level of power efficiency set equal to a current level of power efficiency, the server is only assigned to perform the workload instance if doing so would result in the hardware resources of the server operating at a power efficiency that is the same as, or greater than, the current level of power efficiency. Therefore, additional workload instances may be assigned to the server until it approaches its optimal level of power efficiency. Further workload instances that would push the server utilization higher and result in a reduction in power efficiency would not be assigned to the server under this embodiment.

A technical benefit of a system in which the baseboard management controller of each server determines an efficiency-adjusted (a mis-represented total) available resource capacity is that each server may perform workload instances in a power-efficient range of operation without requiring any change in the manner or logic by which the host device or process makes workload placement decisions. In other words, the host device or process may place a workload instance on any server where the baseboard management controller indicates there is sufficient capacity. Furthermore, each baseboard management controller resides within a particular server and is capable of identifying the power efficiency of one or more server hardware components as a function of utilization. The baseboard management controller may then simply substitute (or mis-represent) the efficiency-adjusted available resource capacity for the total available resource capacity. Optionally, the host may be unaware that the resource capacity information provided by the baseboard management controller has been adjusted to only include that portion of total available capacity that can perform a workload instance in a power-efficient range of operation. Accordingly, the host may make workload placement decisions using the efficiency-adjusted available resource capacity received from the baseboard management controller in the same logic as if it were receiving the total available resource capacity.

A "host" is a device or process that makes workload placement decisions for candidate workload instances and perhaps also for workload instances that are already running on the plurality of servers. For example, the host may be a device or process selected from an operating system (OS), a hypervisor, or a central or global management entity (e.g. Nutanix Prism, VMware vSphere, etc.), such as a cluster management entity. Optionally, the host device may use the efficiency-adjusted available resource capacity reported by the baseboard management controller to provision new workload instances, migrate existing workload instances, or take other action to improve the power efficiency of a workload, server, or system including a plurality of servers.

In some embodiments, the host may receive from a client device an instance of a workload having particular hardware resource requirements for performing the workload instance. The host may be in communication with a plurality of servers and may select one of the plurality of servers to perform the workload. Accordingly, the host may assign or otherwise place a particular workload instance to be performed by a particular server having a reported capacity of resources that is sufficient to perform the workload instance. For example, if the particular workload instance requires a first amount of processor capacity and a second amount of memory capacity, then the particular workload instance may be placed on any server where the baseboard management controller has reported available resource capacity that includes at least the first amount of processor capacity and at least the second amount of memory capacity.

In some embodiments, the currently available hardware resource capacity for the hardware resources within the server is determined by a baseboard management controller that is installed within the server and that is in communication with each of the plurality of hardware resources within the server. The baseboard management controller is a specialized microcontroller on the motherboard of a server that provides the intelligence in accordance with the Intelligent Platform Management Interface (IPMI). Accordingly, the baseboard management controller is involved in out-of-band monitoring and management of the server. In one option, the baseboard management controller may monitor power efficiency and capacity utilization of the hardware resources within the server and may store, for each hardware resource type, data describing the server power efficiency as a function of the utilization for the hardware resources of the hardware resource type within the server.

In some embodiments, the baseboard management controller (BMC) in a computer or server may determine a capacity of available hardware resources within the server that has been adjusted to only include that portion of the total capacity of available resources that can be used while maintaining a setpoint power efficiency. The baseboard management controller of each server may report an efficiency-adjusted available resource capacity to a host device to support a workload placement decision or the baseboard management controller may itself use the efficiency-adjusted available resource capacity in making a determination whether the server has sufficient available capacity to perform a candidate workload instance. Furthermore, the baseboard management controller of each server may provide efficiency adjusted available resource capacity data to the host on a continuously basis, periodic basis, and/or in response to a request or poll received from the host. The baseboard management controller may communicate with the host via an application programming interface (API) for in-band communication, intelligent platform management interface (IPMI) for out-of-band communication, or other manner of communication.

In some embodiments, the baseboard management controller may access, for each of the plurality of hardware resource types required by the candidate workload instance, data describing power efficiency as a function of capacity utilization for the hardware resource of the hardware resource type on the server. For example, the data may be maintained or accessed for a processing unit, memory, graphics processing unit, network adapter, and other components without limitation. Accordingly, the baseboard management controller may estimate a new power efficiency, or a change in power efficiency, for each of the plurality of components as if the additional workload were to be performed on the server. Optionally, the baseboard management controller may monitor, collect and/or store the data describing the server power efficiency as a function of the utilization. The baseboard management controller may monitor an amount of power consumed and an amount of capacity utilization to determine a power efficiency. The baseboard management controller may also monitor utilization level and compare the utilization level to a maximum utilization level, such as may be obtained from performance specifications for the inventory of resources or components in the server.

Some embodiments may include identifying, for each of the plurality of hardware resource types required by the candidate workload instance, an amount of the hardware resources of the server that has already been allocated to perform one or more active workload instances. In many situations, the amount of allocated resources may be significantly different from the current level of utilization of those same resources. A current level of utilization may be used instead of the level of allocated resources. However, identifying the amount of resources already allocated is a more conservative quantity than identifying the current amount of utilization, since the allocated resources will not fluctuate without notice as could the current level of actual utilization. The embodiment may further include calculating, for each of the plurality of hardware resource types required by the candidate workload instance, a projected total utilization of the hardware resource on the server as the sum of the identified amount of the hardware resources of the server that has already been allocated to perform one or more active workload instances plus the capacity of the hardware resource type required to perform the candidate workload instance. In some instances, the projected total utilization may be determined by the baseboard management controller. Next, the embodiment may include identifying, using the data describing the power efficiency as a function of the capacity utilization for the hardware resource of the hardware resource type on the server, a projected power efficiency that is associated with the projected total utilization of the hardware resource on the serve. This projected power efficiency may be reported to the host, which may use this information for making a workload placement decision, including an assignment of the workload instance. Ultimately, the server may be assigned to perform the candidate workload instance in response to the identified projected power efficiency being greater than the projected power efficiencies reported to the host from baseboard management controllers of a plurality of other servers.

In some embodiments, the amount of hardware resources of the server that has already been allocated to perform active workload instances is received by the baseboard management controller from the host. For example, the host may send information to the baseboard management controller of each server characterizing the type and amount hardware resources (central processing unit, memory, etc.) of the server that have already been allocated to perform active workload instances. Alternatively, the baseboard management controller of each server may rely upon its own measurements of capacity utilization for each of the hardware resources. However, there may be a significant difference between the actual utilization or load on a hardware component and an allocated amount of utilization or load. So, the amount of allocated hardware resources received from the host may assist the baseboard management controller in responding with hardware resource pool combinations to the host.

In some embodiments, the baseboard management controller may access data characterizing the server's power efficiency as a function of utilization levels. The baseboard management controller may use the power efficiency as a function of utilization level data in conjunction with the hardware resource requirements of the candidate workload instance and the current utilization level of the server to estimate a new power efficiency, or a change in power efficiency, based on the possibility that the server may be selected to perform the candidate workload instance. Specifically, an additional utilization used to perform the candidate workload instance may be estimated to be equal to the hardware resource requirements of the candidate workload instance divided by the total capacity of the hardware resources. A new total utilization level may then be estimated to be the sum of the additional utilization associated with performing the candidate workload instance and the current utilization level of the server. Then, the power efficiency vs. utilization level data, which may be historical data, may be used to identify the power efficiency that is associated with the new utilization level. Optionally, the power efficiency vs. utilization level data may have any of various types of data structure, such as a lookup table or an algebraic function. However, the power efficiency vs. utilization level data may be considered to be a curve on a graph with power efficiency on the vertical axis and utilization on the horizontal axis.

In some embodiments, the baseboard management controller may determine power efficiency as a function of capacity utilization for a group of the hardware resources on the server that collectively satisfy the hardware resource requirements of the candidate workload instance by combining power efficiency as a function of capacity utilization data for each of the identified hardware components. The baseboard management controller may then report the determined power efficiency as a function of utilization data for the group of hardware resources to the host.

In some embodiments, the baseboard management controller may determine power efficiency as a function of capacity utilization for one or more possible combinations or configurations of hardware resources in the server. For example, if a candidate workload instance is identified to the baseboard management controller as having certain hardware resource requirements (i.e., hardware types and available capacity), then the baseboard management controller may identify specific hardware components within the server that satisfy each of the required hardware types. The baseboard management controller may combine power efficiency as a function of capacity utilization data for each of the identified hardware components to determine power efficiency as a function of capacity utilization data that is representative of the combination or group of hardware resources. The resulting power efficiency as a function of utilization data for the combination of hardware resources required by the candidate workload instance may be reported to the host or used by the baseboard management controller in logic supporting a workload placement decision.

Some embodiments may provide a further technical benefit in that a host may make better workload placement decisions, and a system may be more power efficient, if those workload placement decisions are based on the power-efficiency of the actual combination of hardware resources that may be used by the candidate workload instance rather than based on the power-efficiency of all hardware resources available within the server.

In some embodiments, the host may poll the baseboard management controllers for each of the plurality of servers in the system and cause the baseboard management controllers of each server to report the efficiency-adjusted available resource capacities of components within the server. Accordingly, the host would then identify one or more of the servers having efficiency-adjusted available resource capacities of the components within the server that meet or exceed the hardware requirements of a particular workload instance. The host may then select one of the identified servers and assign the selected server to perform the candidate workload instance.

In some embodiments, the host may advertise the hardware resource requirements of a candidate workload instance to the baseboard management controller for each of the servers in the system so that the baseboard management controller may respond with an affirmative response (able to accept the workload instance), a negative response (not able to accept the workload instance), or some score/scale of how close to the peak efficiency the server would be if it performed the candidate workload instance. In one option, the baseboard management controller may respond with a simple affirmative or negative reply regarding the particular workload instance. In another option, the baseboard management controller of each server may respond with an amount of power efficiency that is estimated to be gained or lost by performing the workload on the server. For example, the baseboard management controller may respond with a percentage of power efficiency that the server is estimated to gain or lose if the server were to perform the workload. The host may then select one of the servers having a baseboard management controller that responded with an affirmative response indicating they are able to perform the candidate workload instance with at least the required hardware resources and without violating the power efficiency rule.

In some embodiments, the baseboard management controller may reply to the host with an affirmative message in response to determining, for each of the plurality of hardware resource types required by the candidate workload instance, that the identified capacity of the hardware resource on the server is greater than or equal to the required capacity for the hardware resource type. On the other hand, the baseboard management controller may reply to the host with a negative message in response to determining, for at least one of the plurality of hardware resource types required by the candidate workload instance, that the identified capacity of the hardware resource on the server is less than the required capacity for the hardware resource type.

In some embodiments, the baseboard management controller may determine an estimated amount of power efficiency gain or loss that the server would experience by performing the candidate workload on the server, wherein the estimated amount of power efficiency gain or loss in reported to the host along with the affirmative response.

Some embodiments may be implemented in a virtualized environment. Accordingly, each of the plurality of servers may perform a virtualization program and enable the server to support one or more virtual machines. Each virtual machine may be assigned to run one of the workload instances. The combinations of hardware resources assigned to any one virtual machine may vary and may be assigned to a server or virtual machine with awareness of the efficiency-adjusted available resource capacity of the server or the efficiency-adjusted resource capacity of the virtual machine.

Some embodiments provide a computer program product comprising a non-volatile computer readable medium and non-transitory program instructions embodied therein, the program instructions being configured to be executable by a processor to cause the processor to perform various operations. The operations include identifying hardware resource requirements of a candidate workload instance, wherein the hardware resource requirements of the candidate workload instance include a required capacity for each of a plurality of hardware resource types. The operation further include identifying, for each of the plurality of hardware resource types required by the candidate workload instance, a capacity of a hardware resource of the hardware resource type that is currently available on a server without causing a power efficiency of the hardware resource to decline below a setpoint level of power efficiency; and determining, for each of the plurality of hardware resource types required by the candidate workload instance, whether the identified capacity of the hardware resource on the server is greater than or equal to the required capacity for the hardware resource type.

The foregoing computer program products may further include program instructions for implementing or initiating any one or more aspects of the methods described herein. Accordingly, a separate description of the methods will not be duplicated in the context of a computer program product. Furthermore, embodiments may provide apparatus including at least one non-volatile storage device storing program instructions and at least one processor configured to process the program instructions, wherein the program instructions are configured to, when processed by the at least one processor, cause the apparatus to perform various operations of the methods or computer program products.

Figure 1:
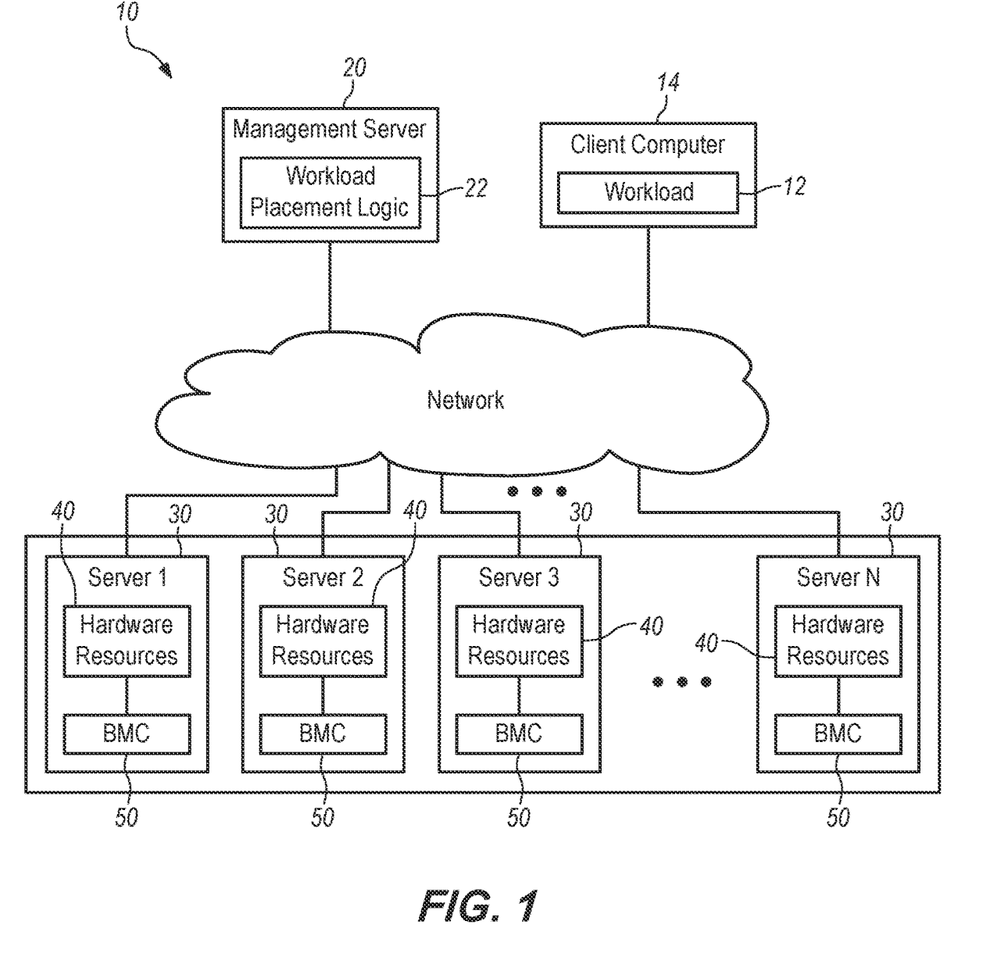
FIG. 1 is a diagram of a server cluster system for performing workload instances received from a client.

FIG. 1 is a diagram of a server cluster system 10 for performing workload instances received from a client. For example, a candidate workload instance 12 may originate from a client device 14 that submits the workload instance to the management server 20 that serves as a host. The management server 20 executes workload placement logic 22 to identify hardware resource requirements of the candidate workload instance 12 and determine where the workload instance should be performed. The management server 20 is in communication with a plurality of servers 30 (Server 1 through Server N) and may assign the candidate workload instance to be performed by any of the servers 30. The workload instance may be referred to as being a "candidate" during the period of time between receipt or identification of the workload instance by the management server and assignment or initial performance of the workload instance to a server.

Each server 30 includes various hardware resources 40 and a baseboard management controller 50. The baseboard management controller 50 may monitor the operation of the hardware resources 40, such as the power consumption and capacity utilization, in order to determine, for at least each hardware resource type, power efficiency as a function of capacity utilization for the hardware resources. Notably, the power efficiency as a function of capacity utilization may vary among hardware components of the same or different hardware resource type and may vary from one server to the next. Similarly, the utilization may vary among hardware components of the same or different type and may vary from one server to the next.

Furthermore, the baseboard management controller 50 is able to communicate with the management server 20, including the workload placement logic 22, to provide information about the operation of the hardware resources 40 that can be used by the workload placement logic 22 to determine which server should be assigned to perform the candidate workload instance 12. In particular, the baseboard management controller 50 may identify an efficiency-adjusted available hardware capacity for each hardware resource type that is required to perform the candidate workload instance 12.

Figure 2:
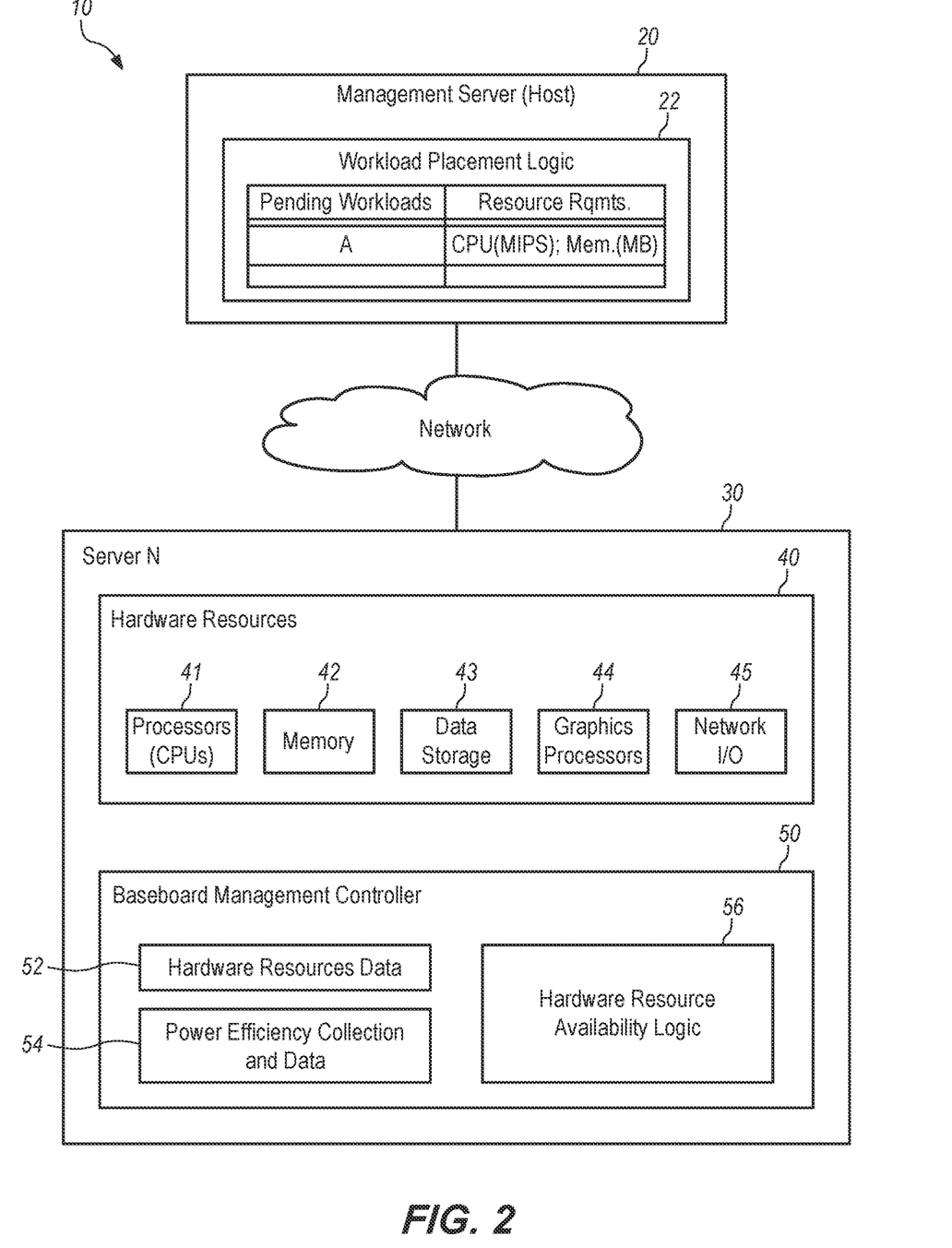
FIG. 2 is a diagram of a management server (host) in communication with a baseboard management controller of a representative server in the server cluster system.

FIG. 2 is a diagram of a management server (host) 20 in communication with a baseboard management controller 40 of a representative server 30 (Server N) in the server cluster system 10. Other baseboard management controllers in other servers of the server cluster system 10 may operate in accordance with one or more embodiments, such as described for Server N.

The management server (host) 20 executes workload placement logic 22, including the functionality to receive candidate workload instances from a client computer and make a workload placement decision. The workload placement decision may use information obtained from the baseboard management controller 50 of the one or more servers 30 (See also FIG. 1). As shown in FIG. 2, the management server 20 has received a candidate or pending workload instance "A" that is associated with hardware resource requirements for the performance of workload instance A. The workload placement logic 22 is illustrated as including or having access to a table or other data structure that associates the pending workload instance (first column) with the hardware resource requirements (second column) for the pending workload. In the illustrated table, the association between the pending workload instance and the hardware resource requirements is illustrated by including them on the same row of the table. The hardware resource requirements (second column) may include some amount or capacity of a CPU (perhaps measured in millions of instructions-per-second (MIPS)), some amount or capacity of memory (perhaps measured in megabytes (MB)), and/or other amounts or capacities of other required hardware types or configurations.

Server N 30 is one of a plurality of servers that perform workload instances assigned to them by the management server 20. The server 30 includes various hardware resources 40, for example including one or more processors 41, memory 42 (such as one or more memory modules), data storage 43, one or more graphics processor 44, and a network adapter or interface 45. The server 30 also includes a baseboard management controller 50 that monitors the hardware resources 40 and communicates with the management server 20 according to one or more of the described embodiments. In order to support operations according to one or more embodiments, the baseboard management controller 50 may execute various modules of program instructions and information, such as hardware resources data module 52, power efficiency collection and data module 54, and hardware resource availability logic module 56. The hardware resources data module 52 may, for example, identify each of a plurality of individual hardware components in the server and perhaps additional information about each hardware component, such as its capabilities, capacity and/or configuration. The power efficiency collection and data module 54 may, for example, include logic that enables the baseboard management controller 50 to obtain information about the operation of each hardware resource to form data describing the power efficiency as function of capacity utilization for the hardware resource or for all hardware resources within the server having the same hardware resource type. The hardware resource availability logic module 56 may, for example, include the program instructions to cause the baseboard management controller 50 to determine an efficiency-adjusted available hardware resource capacity of multiple hardware resource types for reporting to the management server 20 and/or for comparing to the hardware requirements of the candidate workload instance.

Figure 3:
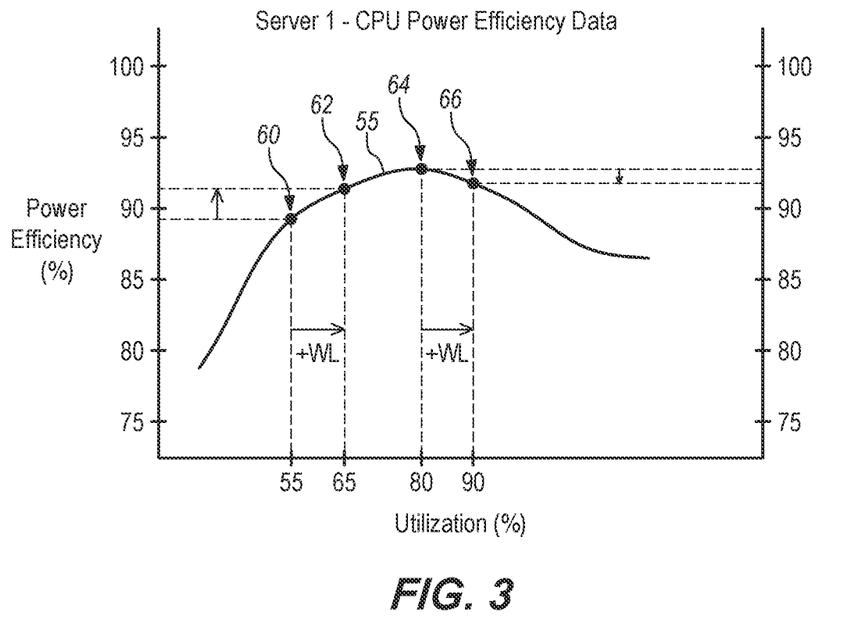
FIG. 3 is a graph of power efficiency as a function of capacity utilization for a server illustrating projected power efficiencies based on current utilization and additional utilization as if a workload instance were assigned to the server.

FIG. 3 is a graph of power efficiency as a function of capacity utilization for a server illustrating projected power efficiencies based on current utilization and additional utilization as if a workload instance were assigned to the server. The curved line 55 represents the power efficiency of a central processing unit (CPU) of Server 1 as a function of the capacity utilization of that CPU. This data may be collected by the baseboard management controller of Server 1 during operation of the CPU at various levels of capacity utilization.

In a first example, if the CPU was performing (executing) active workload instances that put the CPU at 55% utilization (see point 60), the further performance of a candidate workload instance having a processor requirement equating to 10% utilization of the CPU (+WL) would result in a 65% utilization of the CPU. The point 62 on the power efficiency curve, which is associated with a 65% utilization, would be expected to cause the CPU power efficiency to increase from about 88% efficiency to about 91% efficiency. Any power efficiency rule implemented by the baseboard management controller would always allow a power efficiency increase, so in some embodiments the baseboard management controller may report to the management server that Sever 1 has sufficient efficiency-adjusted available CPU capacity to perform the candidate workload instance. More likely, the baseboard management controller would carry out this same analysis as shown in FIG. 3 for each of the hardware resource types required by the candidate workload instance to determine whether Server 1 has sufficient efficiency-adjusted available hardware resource capacity of each hardware resource type to perform the candidate workload instance. Then, the baseboard management controller may provide an affirmative message to the management server indicating that the Server 1 is able to accept an assignment of the candidate workload instance.

In a second example, if the CPU was performing (executing) active workload instances that put the CPU at 80% utilization (see point 64), the further performance of the candidate workload instance having a processor requirement equating to 10% utilization of the CPU (+WL) would result in a 90% utilization of the CPU. The point 66 on the power efficiency curve, which is associated with a 90% utilization, would be expected to cause the CPU power efficiency to decrease from about 93% efficiency to about 92% efficiency. If the power efficiency rule implemented by the baseboard management controller disallowed any decrease in power efficiency, the baseboard management controller may report to the management server that Sever 1 does not have sufficient efficiency-adjusted available CPU capacity to perform the candidate workload instance. While Server 1 clearly has a sufficient amount of available CPU capacity to perform the candidate workload instance, Server 1 cannot perform the candidate workload instance without violating the power efficiency rule of no power efficiency decrease being allowed. Since the CPU does not have sufficient efficiency-adjusted available capacity to perform the candidate workload instance, the baseboard management controller may optionally skip carrying out this same analysis for each of the other hardware resource types required by the candidate workload instance. Then, the baseboard management controller may provide a negative message to the management server indicating that the Server 1 is not able to accept an assignment of the candidate workload instance. The management server does not need to be aware that the baseboard management controller has adjusted the available capacity of the hardware resources on the server to only consider the available capacity that can be used without violating the power efficiency rule.

In another implementation of the same system, the power efficiency rule could be changed—perhaps to allow performance of workload instances that would not cause the power efficiency to drop below 90% efficiency. In this implementation, the baseboard management controller could provide an affirmative message to the management server and accept assignment of the candidate workload instance because doing so would result in a power efficiency of about 92% efficiency in compliance with the power efficiency rule.

Figure 4:
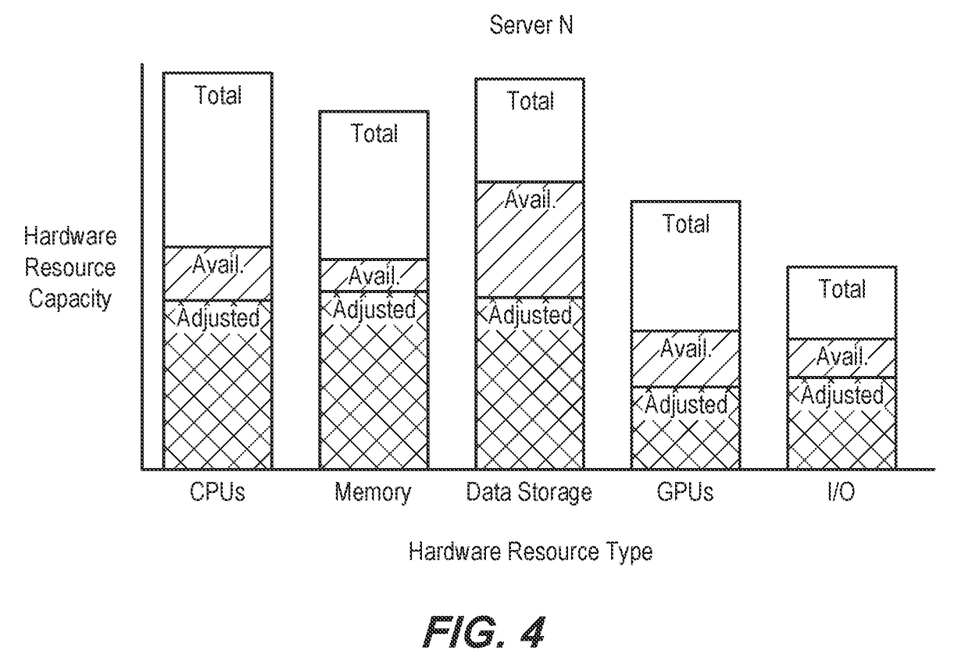
FIG. 4 is a bar chart illustrating a hypothetical relationship of total capacity, available capacity, and efficiency-adjusted available capacity of the hardware resources in a server for each of a plurality of hardware resource types.

FIG. 4 is a bar chart illustrating a hypothetical relationship of total capacity, available capacity, and efficiency-adjusted available capacity of the hardware resources in a server for each of a plurality of hardware resource types. For a given server (Server N), there is one vertical bar for each of a plurality of hardware types. The hardware types of interested may be limited to those that consume the most power or those whose power levels or power efficiencies vary the most as a function of utilization level. Here, the illustrated hardware types include (from left to right) CPUs, memory, data storage, GPUs and network I/O.

The total height of each vertical bar represents the "Total" (maximum) capacity of the hardware resource, which could be considered to represent 100% capacity or some other measure of utilization. However, when the server is being used to perform one or more workload instance, some of the capacity of at least one of the hardware resources will be utilized. So, at any point in time, each hardware resource type may have some amount of "Available" hardware resource capacity that is less than the "Total" hardware resource capacity of the same hardware resource. Note in FIG. 4 that about 50% of the Total capacity of the CPUs of Server N are being utilized, such that the currently "Available" capacity is about 50% of the Total capacity.

However, some embodiments may cause the determination of an "Adjusted" capacity that represents an efficiency-adjusted available hardware resource capacity. Note that the Adjusted capacity is less than the Available capacity because the efficiency-adjusted available hardware resource capacity excludes any portion of the capacity of a hardware resource that would, if used to perform a workload instance, cause the hardware resource to violate a power-efficiency rule. So, the Adjusted capacity represents that portion of the Available capacity that can be used in a power-efficient manner, which is determined according to the standard established by the power efficiency rule. Given that there will be differences in the power efficiency as a function of utilization for different hardware resources and/or hardware resource types, the extent to which the Adjusted capacity differs from the Available capacity may also differ between hardware resources and/or hardware resource types.

Figure 5:
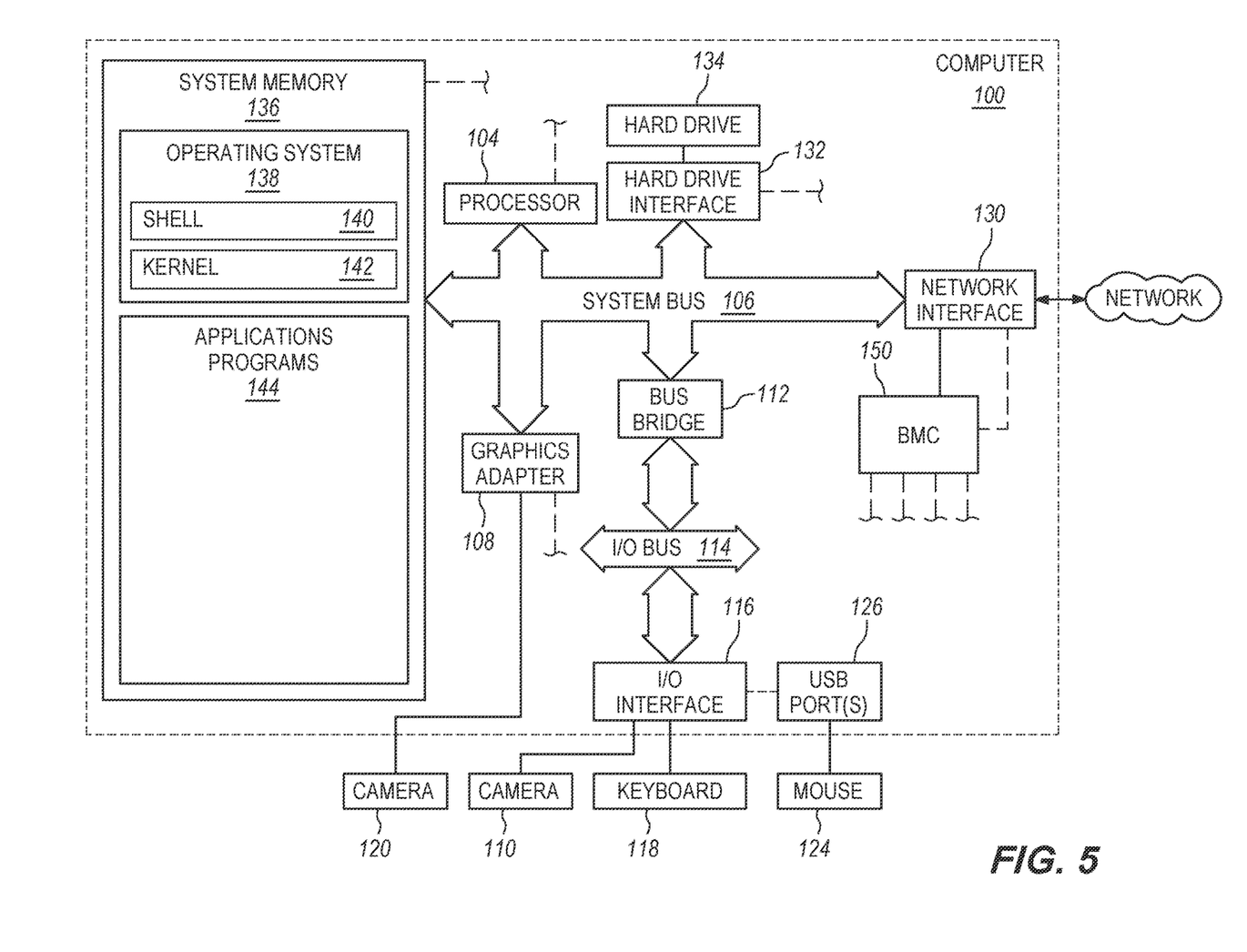
FIG. 5 is block diagram of a server that may perform various operations in accordance with some embodiments.

FIG. 5 is block diagram of a computer 100 that may be representative of the client computer 14, the management server 20 and/or any of the servers 30 of FIG. 1 for performing various operations in accordance with some embodiments. The computer 100 includes a processor unit 104 that is coupled to a system bus 106. The processor unit 104 may utilize one or more processors, each of which has one or more processor cores. A graphics adapter 108, which drives/supports the display 120, is also coupled to system bus 106. The graphics adapter 108 may, for example, include a graphics processing unit (GPU). The system bus 106 is coupled via a bus bridge 112 to an input/output (I/O) bus 114. An I/O interface 116 is coupled to the I/O bus 114. The I/O interface 116 affords communication with various I/O devices, including a camera 110, a keyboard 118 (such as a touch screen virtual keyboard), and a USB mouse 124 via USB port(s) 126 (or other type of pointing device, such as a trackpad). As depicted, the computer 100 is able to communicate with other network devices over the network using a network adapter or network interface controller 130.

A hard drive interface 132 is also coupled to the system bus 106. The hard drive interface 132 interfaces with a hard drive 134. In a preferred embodiment, the hard drive 134 communicates with system memory 136, which is also coupled to the system bus 106. System memory is defined as a lowest level of volatile memory in the computer 100. This volatile memory may include additional higher levels of volatile memory (not shown), including, but not limited to, cache memory, registers and buffers. Data that populates the system memory 136 may include an operating system (OS) 138 and application programs 144. For example, if the computer 100 is implementing the management server 20, then the application programs 144 may include the workload placement logic 22 (see FIG. 1).

The operating system 138 for the computer 100 may include a shell 140 for providing transparent user access to resources such as the application programs 144. Generally, the shell 140 is a program that provides an interpreter and an interface between the user and the operating system. More specifically, the shell 140 executes commands that are entered into a command line user interface or from a file. Thus, the shell 140, also called a command processor, is generally the highest level of the operating system software hierarchy and serves as a command interpreter. The shell may provide a system prompt, interpret commands entered by keyboard, mouse, or other user input media, and send the interpreted command(s) to the appropriate lower levels of the operating system (e.g., a kernel 142) for processing. Note that while the shell 140 may be a text-based, line-oriented user interface, embodiments may support other user interface modes, such as graphical, voice, gestural, etc.

As depicted, the operating system 138 also includes the kernel 142, which may include lower levels of functionality for the operating system 138, including providing essential services required by other parts of the operating system 138 and application programs 144. Such essential services may include memory management, process and task management, disk management, and mouse and keyboard management.

Where the computer 100 represents one of the severs 30 of FIGS. 1 and 2, the computer also includes a baseboard management controller 150 that has a connection (see dashed lines) to various hardware resources (processor 104, memory 136, hard drive interface 132, graphics adapter 108, and network interface 130) that allows the baseboard management controller 150 to monitor operation of these hardware resources on the computer 100. The baseboard management controller 150 is also able to communicate over the network to the management server using a communication connection with the network interface 130.

Figure 6:
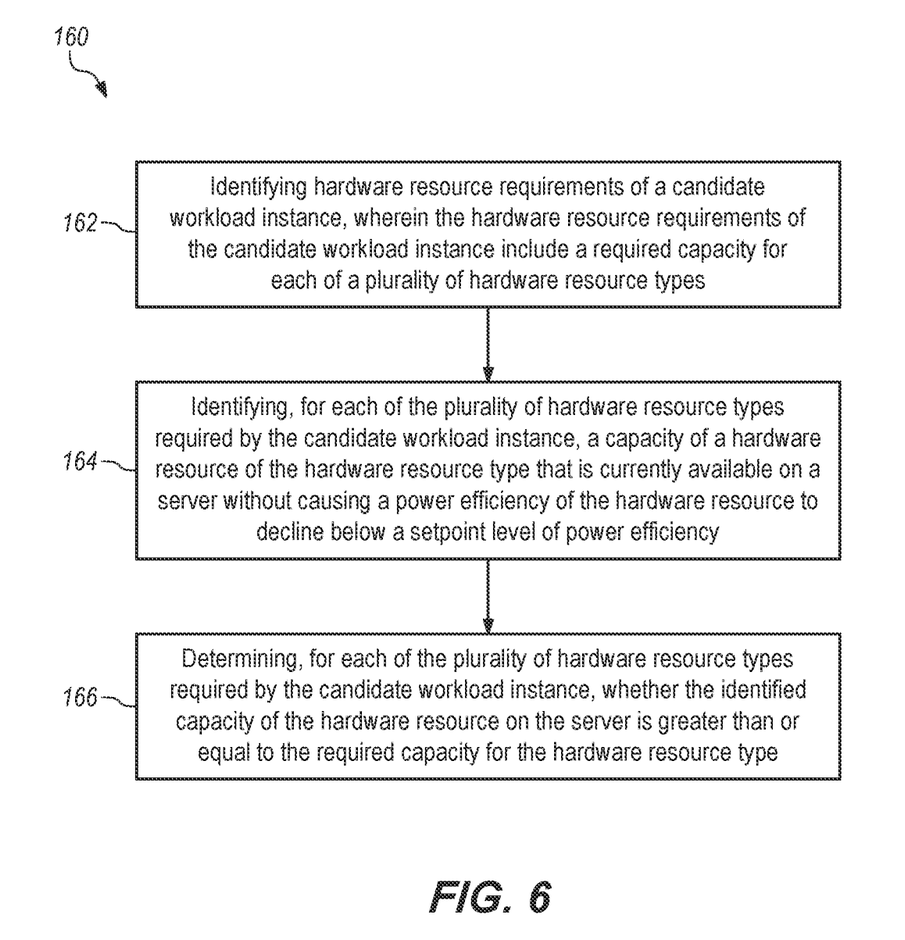
FIG. 6 is flowchart of operations in accordance with some embodiments.

FIG. 6 is flowchart of operations 160 in accordance with some embodiments. Operation 162 includes identifying hardware resource requirements of a candidate workload instance, wherein the hardware resource requirements of the candidate workload instance include a required capacity for each of a plurality of hardware resource types. Operation 164 includes identifying, for each of the plurality of hardware resource types required by the candidate workload instance, a capacity of a hardware resource of the hardware resource type that is currently available on a server without causing a power efficiency of the hardware resource to decline below a setpoint level of power efficiency. Operation 166 includes determining, for each of the plurality of hardware resource types required by the candidate workload instance, whether the identified capacity of the hardware resource on the server is greater than or equal to the required capacity for the hardware resource type. Further operations may be included according to any one or more embodiment disclosed herein.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A method, comprising:
   identifying hardware resource requirements of a candidate workload instance, wherein the hardware resource requirements of the candidate workload instance include a required capacity for each of a plurality of hardware resource types;
   identifying, for each of the plurality of hardware resource types required by the candidate workload instance, a capacity of a hardware resource of the hardware resource type that is currently available on a server without causing a power efficiency of the hardware resource to decline below a setpoint level of power efficiency;
   determining, for each of the plurality of hardware resource types required by the candidate workload instance, whether the identified capacity of the hardware resource on the server is greater than or equal to the required capacity for the hardware resource type; and
   assigning the candidate workload instance to be performed by the server in response to determining, for each of the plurality of hardware resource types required by the candidate workload instance, that the identified capacity of the hardware resource on the server is greater than or equal to the required capacity for the hardware resource type.

2. The method of claim 1, wherein the candidate workload instance is a new workload instance, and wherein assigning the candidate workload instance to be performed by the server includes provisioning the candidate workload instance to the server.

3. The method of claim 1, wherein the candidate workload instance is an active workload instance on another server, and wherein assigning the candidate workload instance to be performed by the server includes migrating the candidate workload instance to the server.

4. The method of claim 1, wherein the identified capacity of the hardware resource on the server is reported to a host device responsible for making a workload placement decision.

5. The method of claim 4, wherein the host may be a device or process selected from an operating system, a hypervisor, or a central management entity.

6. The method of claim 1, characterized in that the identified capacity of the hardware resource of the hardware resource type that is currently available on the server and can be used without causing the hardware resource to operate at less than a setpoint level of power efficiency is less than an available capacity of the hardware resource.

7. The method of claim 1, wherein the hardware resource requirements of the candidate workload instance include an amount of processor usage, memory usage, input/output usage, and GPU usage.

8. The method of claim 1, wherein the setpoint level of power efficiency, for each of the hardware resource types, is equal to a current level of power efficiency for hardware resources of the hardware resource type on the server.

9. The method of claim 1, wherein the currently available hardware resource capacity for the hardware resources within the server is determined by a baseboard management controller that is installed within the server and in communication with each of the plurality of hardware resources within the server.

10. The method of claim 9, further comprising:
the baseboard management controller monitoring power efficiency and capacity utilization of the hardware resources within the server; and
storing, for each hardware resource type, data describing the server power efficiency as a function of the utilization for the hardware resources of the hardware resource type within the server.

11. The method of claim 9, further comprising:
the baseboard management controller receiving from a host a request for the currently available hardware resource capacity for the hardware resources within the server; and
the baseboard management controller providing to the host the currently available hardware resource capacity for the hardware resources within the server.

12. The method of claim 9, further comprising:
the baseboard management controller accessing, for each of the plurality of hardware resource types required by the candidate workload instance, data describing power efficiency as a function of capacity utilization for the hardware resource of the hardware resource type on the server.

13. The method of claim 12, further comprising:
identifying, for each of the plurality of hardware resource types required by the candidate workload instance, an amount of the hardware resources of the server that has already been allocated to perform one or more active workload instances;
calculating, for each of the plurality of hardware resource types required by the candidate workload instance, a projected total utilization of the hardware resource on the server as the sum of the identified amount of the hardware resources of the server that has already been allocated to perform one or more active workload instances plus the capacity of the hardware resource type required to perform the candidate workload instance;
identifying, using the data describing the power efficiency as a function of the capacity utilization for the hardware resource of the hardware resource type on the server, a projected power efficiency that is associated with the projected total utilization of the hardware resource on the server;
reporting the projected power efficiency to the host; and
the server receiving assignment to perform the candidate workload instance in response to the identified projected power efficiency being greater than a project power efficiency reported to the host from baseboard management controllers of a plurality of other servers.

14. The method of claim 13, wherein the amount of hardware resources of the server that has already been allocated to perform active workload instances is received by the baseboard management controller from the host.

15. The method of claim 11, further comprising:
the baseboard management controller determining power efficiency as a function of capacity utilization for a group of the hardware resources on the server that collectively satisfy the hardware resource requirements of the candidate workload instance by combining power efficiency as a function of capacity utilization data for each of the identified hardware components; and
reporting the determined power efficiency vs. utilization data for the group of hardware resources to the host.

16. The method of claim 1, wherein identifying hardware resource requirements of a candidate workload instance includes a baseboard management controller receiving the hardware resource requirements of the candidate workload instance from a host.

17. The method of claim 16, further comprising:
the baseboard management controller replying to the host with an affirmative response in response to determining, for each of the plurality of hardware resource types required by the candidate workload instance, that the identified capacity of the hardware resource on the server is greater than or equal to the required capacity for the hardware resource type; and
the baseboard management controller replying to the host with a negative response in response to determining, for at least one of the plurality of hardware resource types required by the candidate workload instance, that the identified capacity of the hardware resource on the server is less than the required capacity for the hardware resource type.

18. The method of claim 17, further comprising:
the baseboard management controller determining an estimated amount of power efficiency gain or loss that the server would experience by performing the candidate workload on the server, wherein the estimated amount of power efficiency gain or loss is reported to the host along with the affirmative response.

19. A computer program product comprising a non-volatile computer readable medium and non-transitory program instructions embodied therein, the program instructions being configured to be executable by a processor to cause the processor to perform operations comprising:
identifying hardware resource requirements of a candidate workload instance, wherein the hardware resource requirements of the candidate workload instance include a required capacity for each of a plurality of hardware resource types;
identifying, for each of the plurality of hardware resource types required by the candidate workload instance, a capacity of a hardware resource of the hardware resource type that is currently available on a server without causing a power efficiency of the hardware resource to decline below a setpoint level of power efficiency;
determining, for each of the plurality of hardware resource types required by the candidate workload instance, whether the identified capacity of the hardware resource on the server is greater than or equal to the required capacity for the hardware resource type; and assigning the candidate workload instance to be performed by the server in response to determining, for each of the plurality of hardware resource types required by the candidate workload instance, that the identified capacity of the hardware resource on the server is greater than or equal to the required capacity for the hardware resource type.

\* \* \* \* \*